United States Patent [19]
Milling

[11] 3,986,690
[45] Oct. 19, 1976

[54] LASER DEFENSE AND COUNTERMEASURE SYSTEM FOR AIRCRAFT
[75] Inventor: Robert W. Milling, Dayton, Ohio
[73] Assignee: The United States of America as represented by the Secretary of the Air Force, Washington, D.C.
[22] Filed: Oct. 28, 1975
[21] Appl. No.: 625,798

[52] U.S. Cl. .......................... 244/121; 331/DIG. 1; 332/751; 350/103
[51] Int. Cl.² ............................................ B64D 7/00
[58] Field of Search ............... 244/121, 119, 117 R, 244/1 R; 343/18 B, 18 C, 18 E; 350/103; 89/36 Z; 331/DIG. 1, 94.5 T; 332/7.51

[56] References Cited
OTHER PUBLICATIONS
B527,669, Jan. 1976, Poulsen, 331/94.5 T.

Primary Examiner—Stephen G. Kunin
Assistant Examiner—Barry L. Kelmachter
Attorney, Agent, or Firm—Joseph E. Rusz; Richard J. Killoren

[57] ABSTRACT

A passive defense and countermeasure apparatus for an aircraft having a second skin formed as a rectroreflector. The retroreflecting elements are formed in a thin sheet of bright structural aluminum. The retroreflecting sheet is secured to the stringers between the ribs in the wing structure and the stringers between the bulkheads in the fuselage. The retroreflective sheets form part of the exterior load carrying structure of the aircraft.

2 Claims, 5 Drawing Figures

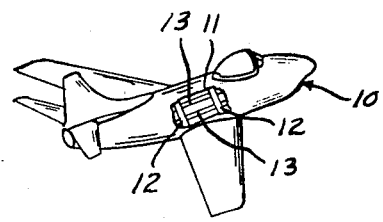
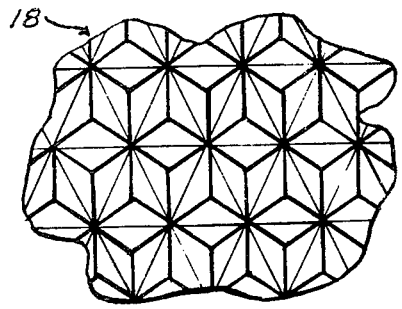
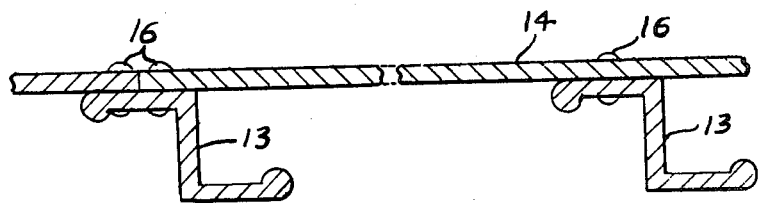
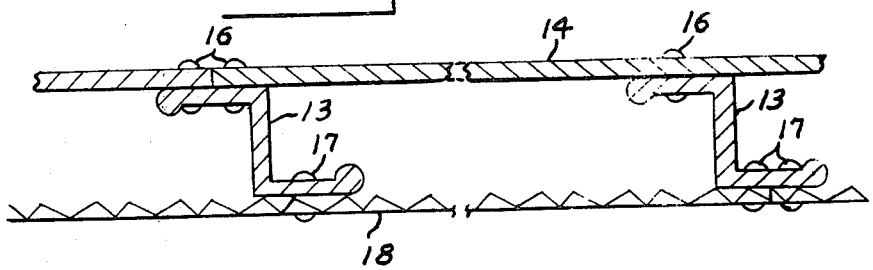
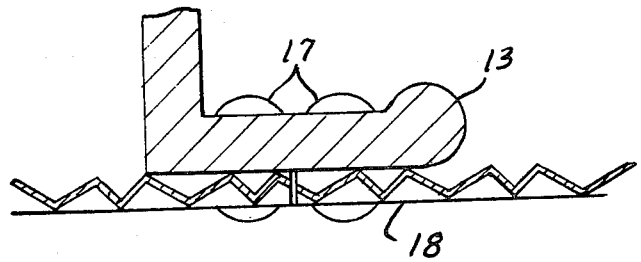

LASER DEFENSE AND COUNTERMEASURE SYSTEM FOR AIRCRAFT

RIGHTS OF THE GOVERNMENT

The invention described herein may be manufactured and used by or for the Government of the United States for all governmental purposes without the payment of any royalty.

BACKGROUND OF THE INVENTION

A high energy laser weapon delivers energy to a target by means of coherent light waves, which heat the target to the melting point. If aircraft are to operate in such an environment, some defense against such weapons must be available. The defensive system used must not cause too great of a weight penalty for the aircraft.

BRIEF SUMMARY OF THE INVENTION

According to this invention, a passive defense and countermeasure apparatus is provided for an aircraft.

Retroreflectors, as described in the patents to Stimson, U.S. Pat. No. 1,671,086, and Rowland, U.S. Pat. No. 2,380,682, are well known in the art.

A retroreflective surface is stamped in a thin sheet of bright structural aluminum alloy. The retroreflective sheets are secured to stringers, for example between the bulkheads of the fuselage or the ribs of the wing structure. Thus, the retroreflective layer is positioned beneath the outer skin of the aircraft and forms a part of the exterior load carrying structure of the aircraft. When the outer skin is penetrated by the incident radiation, a substantial portion of the radiation is reflected back by the retroreflective layer.

Where the weight penalty would not be too great, the entire aircraft could be so protected. However, where the weight penalty would make it impractical to protect the entire aircraft, the protective surface may be used only for more vulnerable portions of the aircraft, such as around the engines, the gas tanks and the control systems.

IN THE DRAWINGS

FIG. 1 is a schematic illustration showing a conventional aircraft which may be modified according to this invention.

FIG. 2 is a partially schematic sectional view of a portion of the exterior structure for an aircraft, such as shown in FIG. 1.

FIG. 3 is a partially schematic view of the structure of FIG. 2 modified according to this invention.

FIG. 4 shows the retroreflective surface for a portion of the inner layer for the device of FIG. 3.

FIG. 5 is an enlarged cut away view of the mounting for the structure of FIG. 3.

DETAILED DESCRIPTION OF THE INVENTION

Reference is now made to FIG. 1 of the drawing, which shows a schematic illustration of an aircraft 10 with a cut away portion 11 exposing bulkheads 12 and stringers 13. The outer skin 14 is normally secured to the bulkhead 12 and to the stringers 13 by means of rivets 16, as shown in FIG. 2.

According to this invention, this structure is modified as shown in FIGS. 3–5. A retroreflective layer 18 shown in greater detail in FIGS. 4 and 5, is riveted to the stringer members 13 between the bulkheads 12, with rivets 17, as shown in greater detail in FIG. 5.

The retroreflective layer 18 is made of thin bright structural aluminum alloy sheets which reflect approximately 95% incident radiation. The retroreflective surface is provided by conventional rolling techniques. A double pass of the aluminum sheet may be required to provide the sharp angles.

Since the inner layer forms a structural member, the weight penalty can be reduced by reducing the thickness of the outer skin slightly. For example, where an aircraft with an outer skin, as shown in FIGS. 1 and 2, has a thickness of 0.075 inch, this could be reduced to 0.065 inch with the inner layer 18 providing some support. The inner layer thickness might then be between 0.013 inch and 0.015 inch.

Since the retroreflective surface is located beneath the outer skin, it will be protected from the environment so that its highly reflective surface will not lose its high reflectivity. A thin clear plastic coating may be deposited on the reflective surface to provide further protection.

In the operation of the device of the invention, when the aircraft is attacked by a laser beam, the outer skin 14 is destroyed thus leaving the retroreflective layer 18 exposed. This layer will then direct about 95 percent of the incident radiation back toward the attacking laser.

There is thus provided a defensive system which will permit an aircraft to operate in an environment wherein it is subject to laser beam attack.

I claim:

1. In an aircraft having structural load bearing members with a plurality of stringer members connected between the load bearing members and having an outer skin secured to the load bearing members and the stringers, a passive defense and countermeasure system for protecting the aircraft against laser weapon energy, comprising: means, within the aircraft for redirecting incident radiation back along the path of incidence; said radiation redirecting means forming a portion of the load bearing members of the aircraft.

2. The device as recited in claim 1 wherein said radiation redirecting means includes thin bright structural aluminum sheets having a plurality of retroreflective elements formed in the outer surface; means for securing the thin aluminum sheets to the inner portions of said stringer members.

* * * * *